(12) United States Patent  
Janzer

(10) Patent No.: US 8,966,590 B2
(45) Date of Patent: *Feb. 24, 2015

(54) MANAGING SOCIAL NETWORK ACCESSIBILITY BASED ON AGE

(71) Applicant: Facebook, Inc., Menlo Park, CA (US)

(72) Inventor: Paul Janzer, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 25 days.

This patent is subject to a terminal disclaimer.

(21) Appl. No.: 13/687,867

(22) Filed: Nov. 28, 2012

(65) Prior Publication Data

US 2014/0150068 A1    May 29, 2014

(51) Int. Cl.
*G06F 7/04* (2006.01)
*H04L 29/06* (2006.01)

(52) U.S. Cl.
CPC .................................... *H04L 63/20* (2013.01)
USPC ............................................. 726/4; 713/152

(58) Field of Classification Search
CPC ....... G06Q 50/01; G06F 15/16; G06F 15/173; H04L 63/20
USPC ............. 726/4, 6, 1, 5, 22, 24, 25, 26, 27, 28, 726/29, 30; 709/203, 206, 218, 219, 223, 709/224; 706/12, 46; 725/40, 46, 60, 131, 725/133; 705/18; 713/152, 187
See application file for complete search history.

(56) References Cited

U.S. PATENT DOCUMENTS

| 6,941,470 | B1* | 9/2005 | Jooste | 726/4 |
|---|---|---|---|---|
| 7,444,671 | B2* | 10/2008 | Jooste | 726/4 |
| 7,451,482 | B2* | 11/2008 | Jooste | 726/4 |
| 7,475,423 | B2* | 1/2009 | Jooste | 726/4 |
| 7,478,423 | B2* | 1/2009 | Jooste | 726/4 |
| 7,606,401 | B2* | 10/2009 | Hoffman et al. | 382/124 |
| 8,234,203 | B1* | 7/2012 | Koretz | 705/37 |
| 8,250,097 | B2* | 8/2012 | Rhodes | 707/783 |
| 8,478,734 | B2* | 7/2013 | Niejadlik | 707/709 |
| 8,510,845 | B1* | 8/2013 | Spertus | 726/26 |
| 8,521,131 | B1* | 8/2013 | Ramalingam et al. | 455/410 |
| 8,620,723 | B1* | 12/2013 | Good | 705/7.34 |
| 8,645,516 | B2* | 2/2014 | Bechtel et al. | 709/223 |
| 2002/0049806 | A1* | 4/2002 | Gatz et al. | 709/203 |

(Continued)

OTHER PUBLICATIONS

United States Notice of Allowance, U.S. Appl. No. 12/858,403, Oct. 25, 2013, sixteen pages.

(Continued)

*Primary Examiner* — Abu Sholeman
(74) *Attorney, Agent, or Firm* — Fenwick & West LLP

(57) ABSTRACT

When a user having an age less than a threshold age (a child user) attempts to access an online service or perform actions using the online service, the online service obtains parental authorization from an additional user having a parental relationship to the user. The child user may identify the user having the parental relationship and the online service verifies the validity of the identified user's account, the age of the identified user, and/or a connection between the identified user and the child user having a parental relationship type. The online service may make these verifications based in part social and transactional information associated with the identified user's account. Upon successful verification, the online service allows the identified user to authorize account creation for the child user, and/or manage the account and actions of the child user.

18 Claims, 6 Drawing Sheets

(56) References Cited

U.S. PATENT DOCUMENTS

| | | | | |
|---|---|---|---|---|
| 2003/0228883 | A1* | 12/2003 | Kusakari et al. | 455/550.1 |
| 2004/0078591 | A1* | 4/2004 | Teixeira et al. | 713/201 |
| 2005/0183137 | A1* | 8/2005 | Jooste | 726/4 |
| 2005/0188422 | A1* | 8/2005 | Jooste | 726/4 |
| 2007/0183354 | A1* | 8/2007 | Schuelke et al. | 370/312 |
| 2007/0256093 | A1* | 11/2007 | Hiler | 725/28 |
| 2008/0140569 | A1 | 6/2008 | Handel | |
| 2008/0189380 | A1 | 8/2008 | Bosworth et al. | |
| 2009/0119299 | A1* | 5/2009 | Rhodes | 707/9 |
| 2009/0217342 | A1* | 8/2009 | Nadler | 726/1 |
| 2009/0241160 | A1* | 9/2009 | Campagna et al. | 725/131 |
| 2009/0265764 | A1 | 10/2009 | Schultz et al. | |
| 2010/0211996 | A1 | 8/2010 | McGeehan et al. | |
| 2010/0211997 | A1 | 8/2010 | McGeehan et al. | |
| 2010/0229223 | A1 | 9/2010 | Shepard et al. | |
| 2011/0047629 | A1* | 2/2011 | Mitchell et al. | 726/28 |
| 2011/0072039 | A1* | 3/2011 | Tayloe | 707/769 |
| 2011/0209192 | A1* | 8/2011 | LeClerc Greer et al. | 726/1 |
| 2011/0237222 | A1* | 9/2011 | Niejadlik | 455/411 |
| 2011/0307403 | A1* | 12/2011 | Rostampour et al. | 705/325 |
| 2011/0314017 | A1 | 12/2011 | Yariv et al. | |
| 2012/0016817 | A1* | 1/2012 | Smith et al. | 706/12 |
| 2012/0047560 | A1* | 2/2012 | Underwood et al. | 726/4 |
| 2012/0171990 | A1* | 7/2012 | Williams et al. | 455/406 |
| 2012/0289147 | A1* | 11/2012 | Raleigh et al. | 455/3.06 |
| 2013/0024516 | A1* | 1/2013 | Blinder | 709/204 |
| 2013/0103750 | A1* | 4/2013 | Awad | 709/203 |
| 2013/0151698 | A1* | 6/2013 | Cooper | 709/224 |
| 2013/0152171 | A1* | 6/2013 | Kindler et al. | 726/4 |
| 2013/0159115 | A1* | 6/2013 | Adams | 705/14.66 |
| 2013/0159123 | A1* | 6/2013 | Hochberg et al. | 705/26.1 |
| 2013/0159132 | A1* | 6/2013 | Adams | 705/26.7 |
| 2013/0159519 | A1* | 6/2013 | Hochberg et al. | 709/225 |
| 2013/0196307 | A1* | 8/2013 | Estrada et al. | 434/430 |
| 2013/0227225 | A1* | 8/2013 | Oliver et al. | 711/154 |
| 2013/0232012 | A1* | 9/2013 | Yan et al. | 705/14.67 |
| 2013/0236070 | A1* | 9/2013 | Sliwinski | 382/118 |
| 2013/0238751 | A1* | 9/2013 | Raleigh et al. | 709/217 |
| 2013/0238761 | A1* | 9/2013 | Raleigh et al. | 709/219 |
| 2013/0238762 | A1* | 9/2013 | Raleigh et al. | 709/219 |
| 2013/0238777 | A1* | 9/2013 | Raleigh et al. | 709/223 |
| 2013/0298006 | A1* | 11/2013 | Good et al. | 715/234 |
| 2013/0339994 | A1* | 12/2013 | Sato | 725/28 |
| 2014/0025760 | A1* | 1/2014 | Shore et al. | 709/206 |
| 2014/0087690 | A1* | 3/2014 | Williams et al. | 455/406 |
| 2014/0122615 | A1* | 5/2014 | Bechtel et al. | 709/205 |
| 2014/0123253 | A1* | 5/2014 | Davis et al. | 726/6 |
| 2014/0150068 | A1* | 5/2014 | Janzer | 726/4 |
| 2014/0156749 | A1* | 6/2014 | Kanter et al. | 709/204 |
| 2014/0255004 | A1* | 9/2014 | Allen et al. | 386/241 |
| 2014/0278968 | A1* | 9/2014 | Strompolos et al. | 705/14.52 |

OTHER PUBLICATIONS

Mailfriends.us, "Start—Welcome," 2000-2014, one page. [Online] [Retrieved Sep. 9, 2014] Retrieved from the Internet <URL:http://www.mailfriends.us/home.html.>.

Penpals.us, "Start—Welcome," 2000-2014, one page. [Online] [Retrieved Sep. 9, 2014] Retrieved from the Internet <http://www.penpals.us/home.html.>.

* cited by examiner

MANAGING SOCIAL NETWORK ACCESSIBILITY BASED ON AGE

CROSS REFERENCE TO RELATED APPLICATIONS

This application is related to U.S. application Ser. No. 12/858,403, filed Aug. 17, 2010, which is incorporated by reference in its entirety.

BACKGROUND

This invention relates generally to social networking systems, and in particular, to managing social networking system access based on user age.

Under certain government regulations, such as the Children's Online Privacy Protection Act (COPPA), operators of social networking systems and other online services that are directed towards children or that may otherwise collect personal information from children are required to obtain parental consent for the collection, use, or disclosure of the children's personal information. Parental consent is also appropriate when children request access to social networking systems and/or other online services that contain mature content or are primarily directed to adults.

Conventionally, parental authorization can be obtained through methods such as requiring credit card information, contacting the parent directly (i.e., via mail or fax), or obtaining a parent's signature on a consent form. These methods may be ineffective and burdensome on a larger scale, especially when hundreds or thousands of children request access to a website each day. Additionally, methods for obtaining parental consent can be subject to fraud and inaccuracies because website operators lack sufficient information to verify that the person providing consent is the child's parent. For example, a child may take his parent's credit card and use it to gain access to a website without the parent's consent. Additionally, online systems, such as social networking systems, are unable to effectively notify parents of their children's interactions over the systems or allow parents to manage a child's online system use.

SUMMARY

Embodiments of the invention allow a social networking system to manage user access based on a user's age. More specifically, if a user's age does not exceed a threshold age, the social networking system allows a different user that is a verified parent of the user to administer the user's account. A user that does not exceed a threshold age is referred to herein as a "child user." The verified parent of a child user provides the social networking system with administrative settings that are used by the social networking system, along with the child user's age, to regulate the child user's access to the social networking system.

In one embodiment, the social networking system may require a child user to obtain authorization from its parent to access the social networking system. In the embodiment, the social networking system receives an indication from the child user that another social networking system user is the child user's parent. The social networking system verifies that the indicated user is the child user's parent based on data stored by the social networking system. For example, the social networking system verifies that an indicated user is a child user's parent based on validity of the indicated user's account, the age specified by the indicated user's account and/or the existence of a parent-child relationship between the accounts associated with the child user and with the indicated user. Hence, data from the indicated user's account and/or from the child user's account is used to verify a parental relationship between the users.

In one embodiment, a verified parent user governs and administers the account for a child user of the verified parent user. For example, the social networking system provides a verified parent user's account with administrative access to the child user's account, allowing the verified parent user to modify various settings of the child user's account. For example, a verified parent user may control connections that the child user may establish, groups or events that the child user may join, software applications that the child user may access, etc.

In one embodiment, the social networking system may automatically limit a child user's access to the social networking system. For example, the social networking system automatically establishes a parent-child relationship between a verified parent user and the child user in the system, and does not allow the child user to unilaterally terminate the established parent-child relationship. As another example, for a child user under the age of thirteen, the social networking system restricts access to the child user's content to other social networking system users connected to the child user. As yet another example, the social networking system prevents other social networking system users from locating the child user via the social networking system or from sending connection requests (e.g., requests to establish a friend relationship) to the child user.

The social networking system may, in an automatic manner, also periodically or continuously notify a verified parent user of actions in the social networking system performed by the child user associated with the verified parent user. For example, the social networking system notifies a verified parent user when an associated child user is invited to an event, sends a friend request and/or receives a friend request.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

An online service, such as social networking system, is configured to obtain parental consent for a child's access to a computing resource and may also allow a verified parent of the child to manage a user account for the child. For example, if an online service user is associated with an age that does not exceed a threshold age (a "child user"), another user that is a verified parent of the child user provides administrative settings regulating the child user's access to a social networking system. For example, a social networking system restricts actions of a child user based on administrative settings provided by the child user's parent. Additional administrative settings allow the verified parent of the child user to monitor actions taken by the child user within the online service. For example, a social networking system may automatically send notifications regarding a child user's actions to a user account associated with a verified parent of the child user.

As used herein, an "online service" includes a social networking system, a website external from the social networking system, an online service, a game or other online application, a media item, or any other computing environment that requires parental authorization. The online service can be a portion of a website, an online application that is run on a website, or media items shown on a website. In some embodiments, the computing resource is a social networking system that provides users a way to connect and communicate with other users. Social networking systems allow users to establish relationships or connections with others and share information in a variety of useful ways.

A user is a person or entity that interacts with other persons or entities via the social networking system and is associated with an approved account in the social networking system. As discussed, a child user is a user having an age that is less than a threshold age. For example, children in the United States under 13 years of age must obtain verifiable parental consent before accessing websites or online services that are directed to children or that collect information from children. In other embodiments, a child user is a user having an age less than an age of consent, such as a user under 18 years old.

System Architecture

Figure 1:
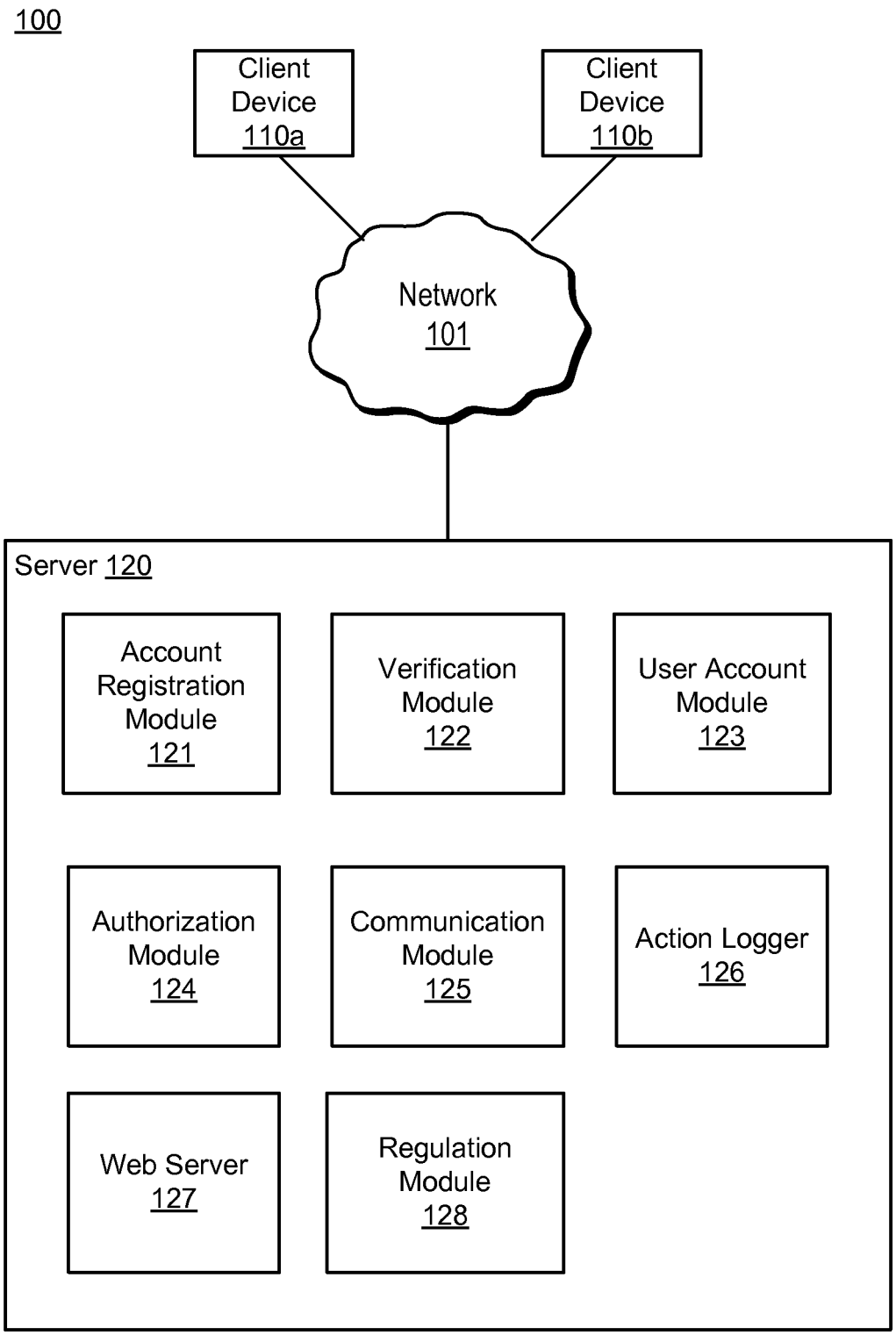
FIG. 1 is a high-level block diagram of a system environment, in accordance with an embodiment of the invention.

FIG. 1 is a block diagram of one embodiment of a system environment 100. In the embodiment shown by FIG. 1, the system environment 100 includes client devices 110a and 110b, a network 101, and a social networking system 120. However, in other embodiments the system environment 100 may include different and/or additional components.

The client devices 110a, 110b are any devices having data processing and data communication capabilities. Examples of client devices 110 include desktop computers, laptop computers, portable computers, personal digital assistants (PDAs), smart phones, or any other device including computing functionality and data communication capabilities. A client device 110 communicates with other client devices 110 and/or with a social networking system 120 via the network 101.

Interactions between a client device 110 and the social networking system 120 are typically performed via the network 101, which enables communication between a client device 110 and the social networking system 120. In one embodiment, the network 101 uses standard communications technologies and/or protocols. Thus, the network 101 may include links using technologies such as Ethernet, 802.11, worldwide interoperability for microwave access (WiMAX), 3G, 4G, LTE, digital subscriber line (DSL), asynchronous transfer mode (ATM), InfiniBand, PCI Express Advanced Switching, etc. The network 101 may also utilize dedicated, custom, or private communications links. The network 101 may comprise any combination of local area and/or wide area networks, using both wired and wireless communication systems.

The social networking system 120 includes accounts associated with users, as further described below. The social networking system 120 receives data from client devices 110 via the network 101 and processes the received data. In one embodiment, the social networking system 120 includes an account registration module 121, a verification module 122, a user account module 123, an authorization module 124, a communication module 125, an action log 126, an application programming interface (API) server 127, and a regulation module 128.

The account registration module 121 receives requests via the network 101 to create accounts from entities using or establishing an account to use a computing resource associated with the social networking system 120. As described above, an entity requesting an account may have an age that does not equal or exceed a threshold age (i.e., a child user). In one embodiment, the account registration module 121 determines whether a request for an account is received from a child user and requests identifying information for an additional user that is a parent of the child user. For example, if data included in a request for an account (e.g., an age, a birth date, etc.) indicating the user's age indicates that the user's age does not equal or exceed a threshold value, the account registration module requests that the user identify an additional user having a parental relationship with the requesting user. The account registration module 121 communicates an identification of the additional user or data identifying the additional user to the verification module 122, which verifies that the additional user has a parental relationship with a child user requesting an account. If an additional user verified as having a parental relationship with a child user provides authorization to the account registration module 121, an account for the child user is created. Verification of a parental relationship between users is further described below in conjunction with FIGS. 3-4.

Referring back to FIG. 1, the user account module 123 stores account data associated with a user's account. The account data includes identifying information about the user, such as the user's name, address, user identification (ID), and password. The user account module 123 stores account data for a plurality of users' accounts. In one aspect, the data includes social data, including information regarding the user's demographic characteristics, such as the user's age, interests, gender, educational history, etc. The data further includes the various connections or edges of the user to other users of the social networking system. The connections may be added explicitly by the user. For example, the user may select a particular other user to be a friend. The connections also may be automatically created by the social networking system based on common characteristics of the users (e.g., users who are alumni of the same educational institution). Connections in social networking systems are usually in both directions, but need not be, so the terms "user" and "friend" depend on the frame of reference. For example, if Bob and Joe are both users and connected to each other in the system, Bob and Joe are also each other's friends. The connection between users may be a direct connection; however, some embodiments of a social networking system allow the connection to be indirect via one or more levels of connections. Also, the term friend need not require that users actually be friends in real life, (which would generally be the case when one of the users is a business or other entity); it simply implies a connection in the social networking system.

Figure 2:
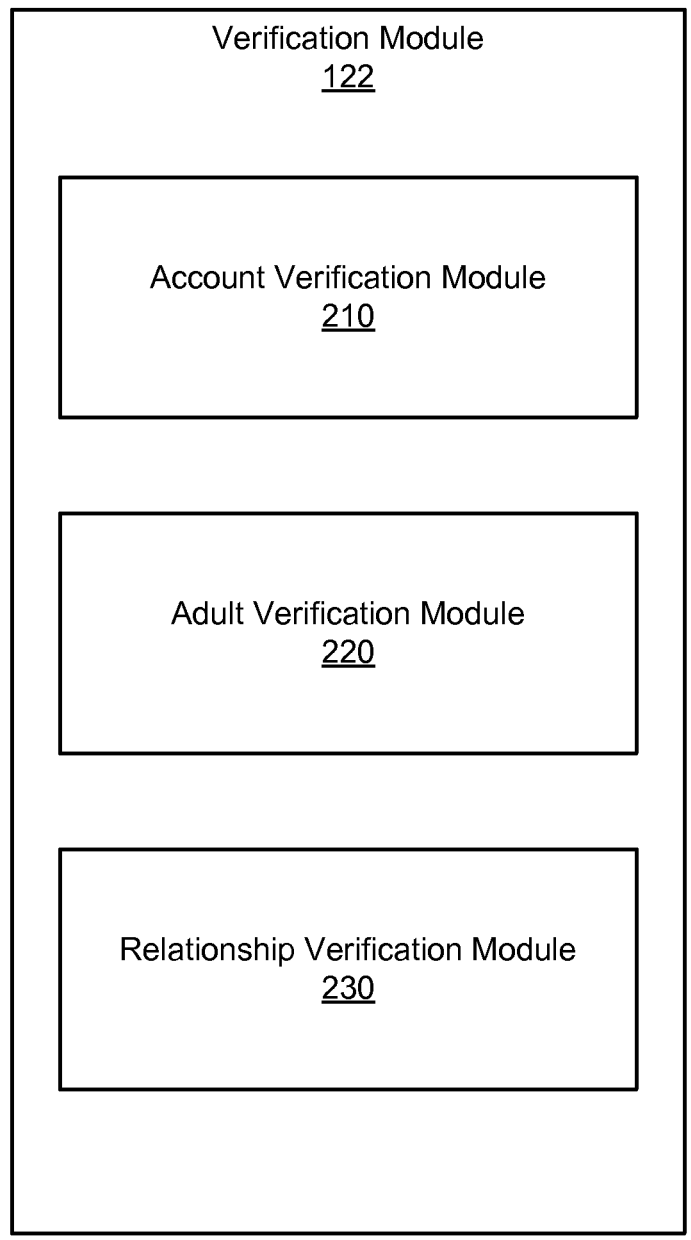
FIG. 2 is a high-level block diagram of the verification modules, in accordance with an embodiment of the invention.

The verification module 122 verifies user accounts alleged to have a parental relationship with another user. In one embodiment, shown in FIG. 2, the verification module 122 includes an account verification module 210, an adult verification module 220, and a relationship verification module 230. For example, the verification module 122 determines whether a user alleged to have a parental relationship with a child user (a "purported parent") has an account with the online service associated with the social networking system 120, whether the purported parent is an adult and whether the purported parent is connected to the child user. In other embodiments, the verification module 122 performs any suitable actions for verifying a parental relationship between a purported parent and a child user.

The account verification module 210 verifies that a purported parent has a valid account. For example, the account verification module 210 compares information identifying a purported parent with stored user accounts to verify that information identifying the purported parent corresponds to information in at least one stored user account. Additionally, the account verification module 210 analyzes a stored user account corresponding to the information identifying a purported parent to verify that the stored user account is authentic. For example, the account verification module 210 retrieves actions, locations, demographic data or other information associated with a user account to determine that the user account is authentic. Illustratively, the account verification module 210 may verify a user account based on the number of established connections associated with the user account. More specifically, the probability that an account is valid increases as the account has more connections. Therefore, the account verification module 210 may determine that an account is authentic if the account has greater than a threshold number of connections. If the user account does not have greater than a threshold number of connections, the account verification module 210 may determine that the account is not valid or, alternatively, flag the account for further verification.

If a user account corresponding to a purported parent is verified, the adult verification module 220 determines an age from data in the user account. For example, the adult verification module 220 compares the age from the user account associated with an adult age threshold and determines that the user account is associated with an adult if the age equals or exceeds the adult age threshold. The adult verification module 220 may use any suitable data to determine the age associated with a user account. For example the adult verification module 220 uses an age declared in the user account, a birth date specified by the user account and the current date, the average age of other user accounts connected to the user account or other suitable data associated with the user account. In one embodiment, the adult verification module 220 determines an age associated with a user account using different types of data to improve the accuracy of the age determination.

The relationship verification module 230 determines whether the purported parent user is the parent of a child user. In some instances, the relationship verification module 230 leverages various social signals (e.g., information derived from connections, user profiles, user actions) to verify a parental relationship. In one embodiment, the relationship verification module 230 determines whether the user account of the child user is connected to the user account associated with the purported parent and, if the accounts are connected, determines whether the connection has a type associated with a parental relationship. Additional data associated with the user accounts of the child user and of the purported parent may be used to verify the parental relationship. For example, location data associated with the child user and purported parent user accounts is analyzed, or pictures having the child user and the purported parent tagged are analyzed to further determine the relationship between the child user and the purported parent. In one embodiment, after verifying a parent-child relationship, the relationship verification module 230 automatically establishes a connection between the user account of the child user and the user account of the purported parent having a specified type indicating a parental relationship.

The authorization module 124 determines whether to create a new user account or to allow access to an existing user account. Additionally, if a child user requests creation of a new user account, the authorization module 124 communicates with the verification module 122 to identify a user account associated with a verified parent of the child user and requests authorization to create the requested account from the verified parent. The communication module 125 communicates a response from the verified parent to the authorization module, which sends the authorization to the account registration module 121 to create the account if the response from the verified parent is an approval. If the response from the verified parent is a denial, the authorization module 124 does not provide authorization to create the account and may communicate a message to the requesting child user via the communication module 125 indicating the account was not created.

The communication module 125 links the social networking system 120 to the one or more client devices 110 via the network 101. The communication module 125 receives requests for data from a client device 110 and communicates data retrieved from the social networking system 120 to a client device 110 via the networking. For example, the communication module 125 serves web pages, as well as other web-related content, such as JAVA®, FLASH®, XML and so forth to client devices 110. The communication module 125 may provide the functionality of receiving and routing messages between the social networking system 120 and client devices 110, for example, instant messages, queued messages (e.g., email), text and SMS (short message service) messages, or messages sent using any other suitable messaging technique. The communication module 125 receives requests from a client device 110 to create a user account and communicates the requests to the account registration module 121, to the verification module 122 or to any other suitable component.

The action logger 126 receives communications about user actions on and/or off the online service associated with the social networking system 120 and maintains a log describing the actions. Examples of actions may include, for example, adding a connection to another user, sending a message to another user, uploading an image, reading a message from another user, viewing content associated with another user, attending an event posted by another user, among others. The action logger 126 may store various types of data describing actions. Examples of stored data describing actions include the date and/or time when an action was performed, a user account identifier of the user performing the action, a type associated with the action, an object on which the action was performed or other data. Actions performed by a user on online services other than the online service associated with the social networking system 120 may be stored by the action logger 126. For example, if the online service associated with the social networking system 120 is a social networking system, the action logger 126 may store user actions taken within the social networking system as well as actions taken on websites external to the social networking system.

The web server 127 links the social networking system 120 to external websites and/or to client devices 110. In one embodiment, the web server 127 allows external systems to send information to the social networking system 120 by calling APIs via the network 101. The web server 127 processes the request by calling the appropriate program code to collect appropriate data, which is then communicated back to the external system via web server 127 the network 101. A request for parental authorization of a child user's use of the online service associated with the social networking system 120 may be received by the web server 127. The web server 127 may also transmit a request for authorization of a child user's account to one or more client devices 110 via the network 101.

The regulation module 128 enables a verified parent user to administer and/or govern accounts of child users associated with the verified parent user. Additionally, the regulation module 128 governs the various users (including child users) of the online service associated with the social networking system 120. For example, the regulation module 128 manages different types of interactions that users of the online service may perform and manages the types of information that may be presented to the various users of the online service.

Using the regulation module 128, a verified parent user may define settings for governing the interactions of an associated child user, may define the types of information that can be presented to the child user, or may define other suitable configuration settings. In one embodiment, the regulation module 128 restricts or limits the access of users identified as child users based on settings received from verified parents associated with the child user. For example, the regulation module 128 receives a setting from a verified parent user indicating that requests from other users to connect to a child user associated with the verified parent user must first be approved by the verified parent user. A process for administering and governing a child user's account is further described below in conjunction with FIG. 6.

Child User Account Verification

Figure 3:
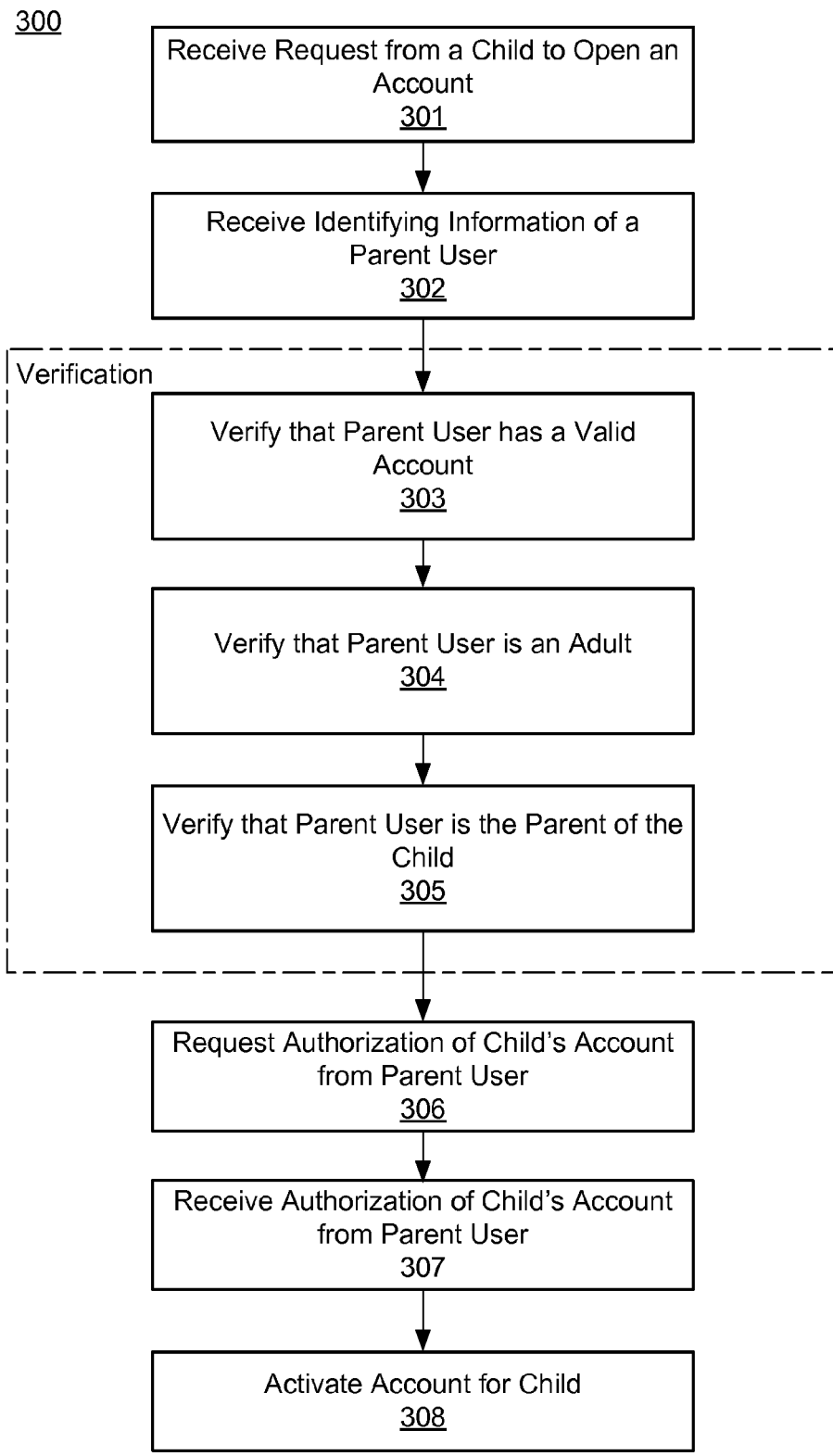
FIG. 3 is a flowchart of a parental authorization process, in accordance with an embodiment of the invention.

FIG. 3 illustrates a flow chart of one embodiment of a method 300 for obtaining parental consent for a child user's account for an online service. In the embodiment shown by FIG. 3, the account registration module 121 receives 301 a request to open an account in the online service and determines that the request is from a child. For example, based on data (e.g., a provided age, a provided birth date, etc.) included in the request, the account registration module 121 determines an age associated with the requesting entity and determines whether the age is less than a threshold age. If the age of the requesting entity does not equal or exceed the threshold age, the account registration module 121 determines that the requesting entity is a child and requests, from the child, information identifying a parent. The account registration module 121 receives 302 information identifying a parent user, which is the purported parent of the child. Examples of information identifying a parent user include: a name, an address, contact information (telephone number, email address), user identification (ID) information, account identifier, screen name or other suitable information.

Using the information identifying the parent user, the verification module 122 verifies 303 that the identified parent user has a valid account with the online service, verifies 304 that the identified parent user is an adult, and verifies 305 that the identified parent user is the parent of the child. The verification module 122 is further described above in conjunction with FIG. 2. While FIG. 3 describes verifying 303 that the parent user has a valid account, verifying 304 that the identified parent user has at least an adult threshold age and verifying 305 that the identified parent user is the parent of the child user requesting an account, in different embodiments, a subset of these verifications are performed or additional verifications are performed. The order in which the identified parent user is verified as the parent of the child user requesting an account may vary in different embodiments.

As discussed, the verification module 122 verifies 303 that the identified parent user has a valid account with the online service associated with the social networking system 120. A valid account is an account that is owned and accessed by a real person who is authorized to use the account and is also associated with legitimate and safe activities in the system. Conversely, an account associated with the identified parent user is not valid if it does not exist in the system (i.e., the name of the identified parent user is not registered with an account).

An account may also be invalid if it has been fraudulently accessed or used by someone other than the authorized user. For example, an account may be invalid if confidential information has been accessed from the account, such as the user ID, password, or account numbers without consent of the user associated with the account. An account is also invalid if the account has been used to engage in suspicious activities or if the account has been accessed from a suspicious location, which is discussed in detail herein. In some embodiments, an account is invalid because it was created for an illegitimate use in the online service. For instance, if a user creates multiple accounts for engaging in an online game in a social networking system, the multiple accounts would be invalid as they were created for an illegitimate use.

Figure 4:
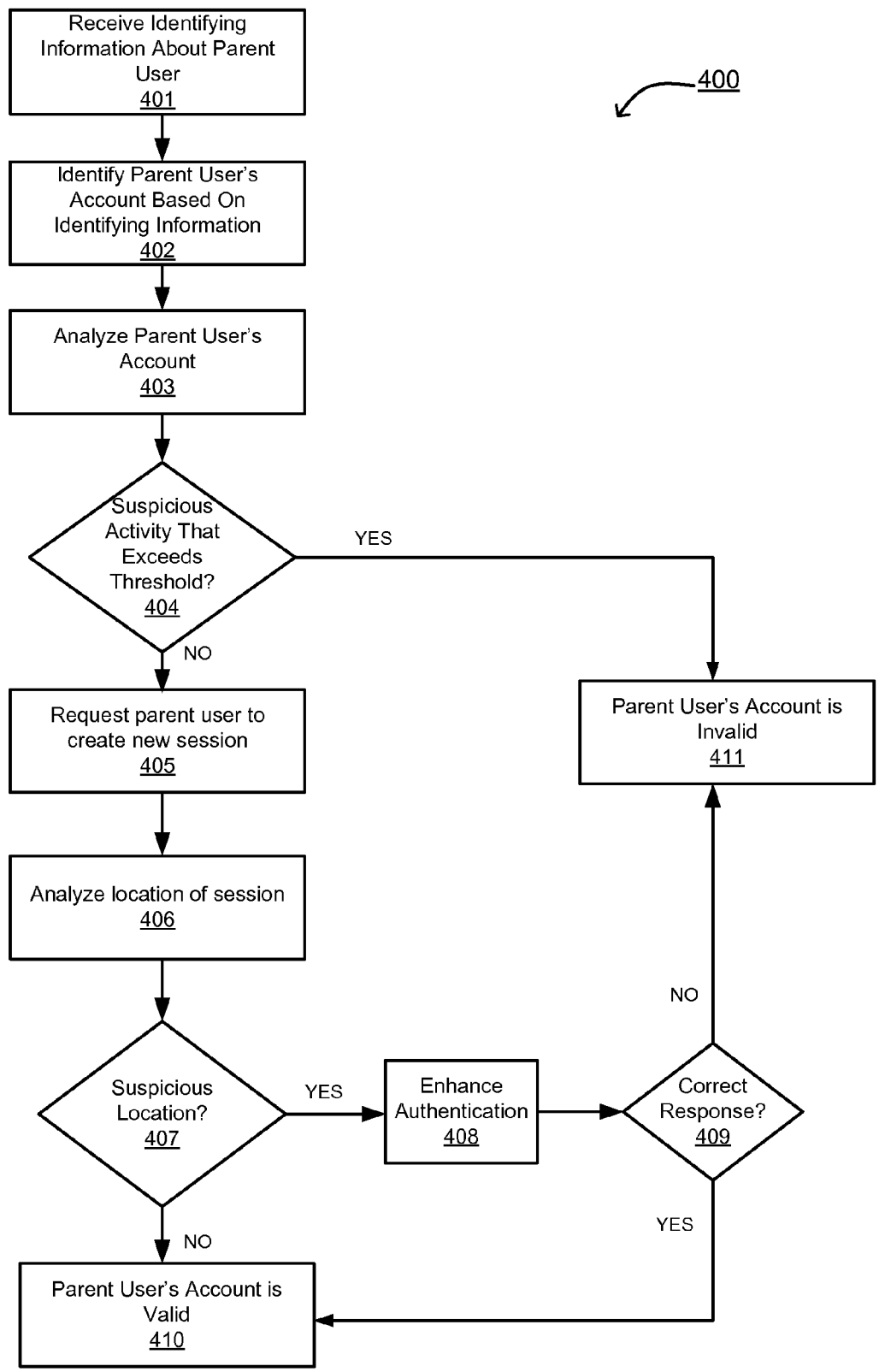
FIG. 4 is a flowchart of an account verification process, in accordance with an embodiment of the invention.

FIG. 4 shows a flow chart of one embodiment of a detailed process for verifying 303 the validity of an account associated with an identified parent user. In one embodiment, the process described in conjunction with FIG. 4 is performed by the account verification module 210 of the verification module 122. The account verification module 210 receives 401 information identifying the user that is the purported parent user of the child user and identifies 402 the parent user's account based on the information. If the account verification module 210 determines that a purported parent user's account does not exist or has been abandoned, the account verification module 210 denies the child user's request for an account.

If an account is associated with the purported parent user, the account is analyzed 403 to determine whether it is associated with a legitimate user. For example, actions from the action log module 126 associated with the purported parent user's account are analyzed 403. A valid account is likely to engage in safe or quality activities enhancing communication, establishing connections or providing content to the online service. Examples of safe or quality activities include: establishing connections with other users; sending messages to other users; posting stories, pictures, or links on profiles; participating in online discussions; commenting on other user's posts; and joining groups, events, or communities.

A purported parent user's account that is connected with a threshold number of other users or that has engaged in a threshold number of quality interactions in the social networking system is likely to be a valid account. Moreover, a purported parent user's account that has received communications or requests for connections from other users is likely to be a valid account because a legitimate user would receive communications or requests to connect with others. In contrast, a purported parent's account that has engaged in less than a threshold number of interactions or received less than a threshold amount of communication from other users is likely to be an invalid account. Additionally, the length of time that the purported parent's account has been established and actively used may be a factor in determining the account's validity. For example, an account that has been in active use for a threshold amount of time (e.g., a year) may be an indication that the account is valid.

The authenticity of other user accounts that are connected to the purported parent user may be analyzed 403. For example, other user accounts connected with the purported parent user's account may lack multiple connections with other users or have low quality interactions in the social networking system, indicating that these accounts are invalid. Accordingly, the parent user's account, which is connected to the likely invalid accounts, may also be invalid. Conversely, if the user accounts connected to the purported parent user's account have a threshold number of connections and are associated with a threshold number of quality activities, the purported parent user's account is likely to be valid. Accounts of multiple users associated with the purported parent user may be tracked and analyzed to determine whether a group of fake accounts are connected to each other.

In one embodiment, the purported parent user's account is analyzed 403 for suspicious activities, which occur when an entity other than an authorized user creates a session by obtaining fraudulent access to the purported parent user's account (i.e., obtaining the user ID and password of an account and logging into the account pretending to be the authorized user). Examples of suspicious activities include spamming (i.e., sending unsolicited advertisements, messages or requests to other users), phishing (i.e., attempting to obtain confidential information from other users), accessing sensitive information (i.e., social security numbers or credit card numbers), or any other type of illegitimate or objectionable actions that negatively affect other users. If suspicious activities are associated with the purported user's account, the account verification module 210 determines 404 whether the suspicious activities exceed a specified threshold. The purported parent user's account is classified 411 as invalid if the suspicious activities exceed the threshold. For example, a threshold is set where a user's account is classified 411 as invalid if it is used to send more than one spam message to other users. Systems and methods for managing objectionable behavior in a web-based social networking system are disclosed in U.S. application Ser. No. 11/701,744, filed on Feb. 2, 2007, which is incorporated by reference herein in its entirety.

In some embodiments, if the suspicious activity associated with the user's account does not exceed the threshold, further verification steps may be performed. For example, the verification module 122 request 405 that the purported parent user create a new session with the online service. A session is created when a user accesses the user's account by logging into the online service or accessing a website associated with the online service. Requesting 405 creation of a new session allows the account verification module 210 to analyze 406 a location associated with the new session to determine 407 whether the purported parent user is accessing the account from a suspicious location. The location of the session is received from a client device 110 associated with the purported parent user. A session's location may include the geographical location of the client device 110, information about the physical attributes of the client device 110 used by the user, the network address associated with the newly created session or other identifying information.

Typically, a user regularly creates sessions from the same set of locations, such as from client devices 110 in a home and/or in a workplace. For example, a user may routinely establish sessions with the online service from its home in Palo Alto, Calif. or its place of work in Mountain View, Calif. These locations may be referred to as "safe locations." A user is less likely to establish a session using client devices 110 that are in locations distant from the safe locations. Hence, a session created from a distant location may be considered suspicious or unsafe. Referring to the preceding example, a session established from Mexico City, Mexico would be an atypical user location that would be considered suspicious.

Further, certain geographic locations, user locations, or network addresses may be associated with a negative reputation based on a past history of suspicious sessions created from those locations. An attempt to create a session from a location having a negative reputation may be flagged as suspicious. For example, a location in Nigeria may have a reputation for phishing and other fraudulent online activities. If a purported parent user's account that is typically associated with locations in the U.S. creates a new session from the location in Nigeria the session is flagged to indicate that the purported parent user's account may be invalid.

Based on the location information from the newly created session, the account verification module 210 determines 407 whether the newly created session is associated with a suspicious location. In some embodiments, the account verification module 210 determines 407 whether the location associated with the newly created session matches a stored location identified as safe. If the location does not match a stored safe location, the account verification module 210 determines 407 whether the location matches one of the known suspicious locations. Alternatively, the account verification module 210 determines 407 whether the location of the new session matches a suspicious location, and classifies 411 the purported parent's account as invalid if the location matches a suspicious location. In other embodiments, the purported parent's account is not classified 411 as invalid until a threshold number of sessions are associated with being suspicious. Authenticating user sessions based on reputation of user locations is disclosed in U.S. patent application Ser. No. 12/646,800, filed on Dec. 23, 2009, and U.S. patent application Ser. No. 12/646,803, filed on Dec. 23, 2009, each of which is incorporated by reference herein in its entirety.

In some embodiments, if the purported parent creates a new session from a suspicious location, authentication of the purported parent user's account is enhanced 408. In one embodiment, authentication is enhanced 408 by providing a challenge-response test to the purported parent user. A challenge-response test provides a challenge to the user, which requests a response that only the authorized user of the account would likely be able to answer. For example, a challenge may be a security question based on information that only a user authorized to access the purported parent user's account is likely to know.

One type of challenge is a "Completely Automated Turing Test To Tell Computers and Humans Apart" (CAPTCHA), which requires a user to read distorted text and type the letters or numbers to authenticate that the user is not an automated system or computer that has improperly gained access to the user's account. A social CAPTCHA is another type of challenge that can be presented to a user of a social networking system. The social CAPTCHA asks the user to identify information about other users connected to the user or about interactions in the social networking system. For example, a user may be presented with five users and asked which of them is connected to the user in the social networking system. The difficulty level of the social CAPTCHA may be adjusted based on a degree of suspicion associated with the account. Examples of increasing social CAPTCHA difficulty include: requesting identification of more specialized types or information in a challenge, increasing the number of questions presented, or increasing the number of potential answers from which answers are chosen. Using social information to authenticate a user session is disclosed in U.S. application Ser. No. 12/399,723, filed on Mar. 6, 2009, which is incorporated by reference herein in its entirety.

In some embodiments, the social CAPTCHA may be presented to a user at any time when suspicious activity is associated with the user's account to validate the account. For example, a social CAPTCHA may be presented to the user when suspicious activities are identified from past sessions associated with the user's account. In one embodiment, the social CAPTCHA is presented after requesting 405 a user create a new session. The enhanced authentication may be presented in a variety of ways, such as via email, text message, multimedia messaging service (MMS), or other type of online communication.

The account verification module 210 determines 409 whether a correct response to the enhanced 408 authentication is received from the purported parent user. An incorrect response to the challenge results the purported parent user's account being classified 411 as invalid. In some embodiments, the purported parent user's account is not classified 411 as invalid until the number of incorrect responses to the enhanced authentication 408 equals or exceeds a threshold. If the purported parent user provides a correct response to the enhanced 408 authentication, the purported parent user's account is classified 410 as valid.

A purported parent user's account may also or additionally be analyzed by the account verification module 210 for suspicious activities associated with the account that occur on third-party websites. For instance, a purported parent user's account in a social networking system is used to connect to third party websites, such as an online retail website or an online banking service and the purported parent user's actions with the third party website are analyzed for suspicious activities. For example, a purported parent user's account is used to log into a third party online classifieds website and post fraudulent sales items on the website. Analyzing this information may indicate that the purported parent user's account has been compromised and may be invalid. Activities by the purported parent user's account, such as suspicious activities, on third party websites may be analyzed using the methods described above to determine whether the parent user's account is valid.

In another embodiment, a confidence score or metric is calculated for the purported parent user's account based on a variety of data using the methods described above. If the confidence score equals or exceeds a threshold, the purported parent user's account is classified as valid. However, if the confidence store is less than the threshold, the purported parent user's account is classified as invalid. In other embodiments, challenge-response, such as a social CAPTCHA, is presented to the purported parent user to enhance authentication if the confidence score is less than the threshold.

Adult Verification

Referring back to FIG. 3, if the purported parent user's account is verified 303 as valid, the verification module 122 verifies 304 that the purported parent user is an adult. For example, the adult verification module 220 verifies 304 the age of the purported parent user based on social data associated with the account of the parent user. In some embodiments, the purported parent user's age is determined from information in the purported parent user's account. For example an age or birth date included in the purported parent user's account is used to verify 304 that the purported parent user's age is at least an adult age threshold. Alternatively, the adult verification module 220 asks the purported parent user for its age and compares the provided age to the adult age threshold.

The adult verification module 220 may also determine the purported parent user's age based on social signals associated with the purported parent user's account. For example, social signal data associated with the purported parent user's account is analyzed using a histogram, and various calculations may be made from the histogram, including the average, median, skew, and kurtosis of the social data set. For example, the average age of users connected to the purported parent user is determined from a histogram. If the average age of the users connected to the purported parent user equals or exceeds the adult age threshold (e.g., 35 years old), the adult verification module 220 verifies 304 the purported parent user is an adult.

In some embodiments, the activities associated with the purported parent user's account are analyzed to determine the age of the purported parent user. Activities associated with the purported parent user's account may provide an indication of the purported parent user's approximate age. Examples of activities providing information about an approximate age include joining a university's alumni organization webpage, posting comments or links related to news articles or political stories with adult-oriented topics, including profile information showing an employment history or joining an employment-based network. If a threshold number or percentage of activities associated with the purported parent user's account is adult-oriented, the purported parent user is likely to be an adult.

Various other social data may indicate whether the purported parent user is an adult, such as data indicating that the parent user is employed or is married. The adult verification module 220 may analyze various social data as factors, either alone or in combination, to determine whether the parent user is an adult. In some embodiments, each factor is given a confidence score and the confidence scores are combined to form an overall confidence score. If the overall confidence score exceeds a threshold score, the parent user is verified 304 as an adult.

In some embodiments, a machine learning process verifies 304 whether the parent user is an adult based on inputs derived from various social data. Examples of input include the average, median, skew, and kurtosis obtained from a histogram of the social data. Additional examples of inputs include binary inputs from the social data, such as whether the purported parent user is employed or is married.

A machine learning process may be trained using inputs based on social data from a parent user verified to be an adult. Various rules and coefficients may be used to adjust the machine learning process to accurately predict whether a purported parent user is an adult. After training on a known data set, the machine learning process may be used to determine whether other purported parent users are adults. For example, the machine learning process receives as input various signals about the average age of users connected with a purported parent user, the median age of the users connected to the purported parent user, whether the purported parent user has engaged in adult-associated activities, and whether the purported parent user is married. The machine learning process determines whether the potential parent user is an adult based on the rules, coefficients and the inputs.

Relationship Verification

The verification module 122 verifies 305 that the purported parent user is a parent of the child user. In one embodiment, the relationship verification module 230 requests that the purported parent user confirm that he or she is the parent of the child. Alternatively, the relationship verification module 230 requests that the purported parent user declare a parent-child relationship between the purported parent user's account and the child user's account.

In another embodiment, the relationship verification module 230 determines whether the purported parent user is the parent of the child user by comparing social data about the purported parent user with data provided by the child user. For example, the relationship verification module 230 determines that the purported parent user and the child user have the same last names, live in the same region, have the same address, or have declared relationships with the same family members. In one embodiment, the relationship verification module 230 determines a distance between a current city or other reported residence of the purported parent and a residence or other location provided by the child user. If the distance between the purported parent's residence and the child user's reported residence is within a threshold distance, the relationship verification module 230 determines that the purported parent and the child user have a valid parental relationship. However, if the distance between the purported parent's residence and the child user's residence is not within the threshold distance, the relationship verification module 230 determines that the purported parent and the child user do not have a valid parental relationship or flags the parental relationship as potentially invalid.

The relationship verification module 230 may also determine whether the reported ages of the purported parent and the child user have a difference equaling or exceeding a threshold number of years. If the difference between the ages of the purported parent and the child user is less than the threshold number of years, the verification module 230 may determine that there is not a parental relationship between the purported parent and the child user or may flag a parental relationship between the purported parent and the child user as potentially invalid. For example, if the difference in age of the purported parent and the age of the child user is less than fifteen years, the verification module 230 determines that the purported parent and the child user do not have a valid parent-child relationship.

Actions of the purported parent user may be analyzed to determine the existence of a parent-child relationship. A parent user may share pictures of its children on its profile, post stories on its profile about its children, send messages to other users about its children, or post events related to its children (for example, birthday parties or school-related activities) in an online service (e.g., a social networking system). Hence, analyzing actions of the purported parent user for certain types of actions and/or for actions associated with the child user may be used to verify 305 a parental relationship between the purported parent user and the child user.

Connections between the purported parent user and other users may also be used to verify 305 a parental relationship between the purported parent user and the child user. For example, the purported parent user has verified a parent-child relationship with some of its other children in the online service. If other child users connected to the purported parent have similar attributes to the child user requesting the account, a parental relationship between the purported parent user and the child user requesting the account may be verified 305. For example if other child users having a verified parental relationship with the purported parent user have the same last names or other identifying information as the requesting child user, the parental relationship between the purported parent user and the requesting child user is verified 305.

Other social data associated with the purported parent user may be used to verify 305 the parental relationship between the purported parent user and the child user. For example, users connected to the purported parent user in the online service may be asked to verify 305 the existence of the parental relationship. As another example, the purported parent user is asked questions about the child user account to verify 305 the parent-child relationship. The above-described factors, as well as other factors, may be analyzed independently or in combination to verify 305 a parental relationship between the purported parent user and the child user. In some embodiments, each factor is given a confidence score, which are combined to generate an overall confidence score. If the overall confidence score is equals or exceeds a threshold score, the parent-child relationship is verified 305. Alternatively, a machine learning process is used to verify 305 the existence of a parent-child relationship using social data (e.g., activities of the purported parent in the social networking system, whether the purported parent user and the child user have the same last names, same addresses, and/or or same user locations). The machine learning process may operate as described above.

After verifying 303 the purported parent user's account, verifying 304 the purported parent user's age and verifying 305 the parental relationship between the purported parent user and the child user, the verification module 122 may request 306 authorization of the child user's account from the purported parent user. If the online service is a social networking system, authorization of the child user's account may be requested 306 using any suitable communication channel, such as e-mail, text message, multimedia messaging service (MMS), instant message, or other online communication. In one embodiment, the purported parent user is capable of authorizing the child user's account if the purported parent user has an account with the online service. Alternatively or additionally, the purported parent user may provide information authorizing the child user's account, such as a confirmation e-mail or confirmation message, regardless of whether the purported parent user has an account with the online service When requesting 306 authorization of the child user's account, the verification module 122 may specify additional information and/or additional steps for the purported parent user to verify the child user's account. For example, an authorization request specifies that the purported parent user provide a portion of an identification number associated with the purported parent user (e.g., last four digits of a social security number, last four digits of a credit card number, etc.) to authorize the child user's account. A third-party verification company may use the identification number to confirm that authorization was received from the purported parent user. As another example, the authorization request specifies that the authorization be received from a confirmed email address or as an SMS message from a mobile phone. The information and/or steps identified by the authorization request may be based on the specific country and/or jurisdiction of the purported parent user and/or child user.

When authorization of the child user's account is received 307 from the purported parent user, the child user's account is activated 308, allowing the child user to access the online system. In one embodiment, after activating 308 the child user's account, a connection between the purported parent user's account and the child user's account is established. The connection has a type associated with a parental relationship. In one embodiment, the child user is also automatically added to a close friends or children list of the parent user. The child user, however, may still restrict the parent user from seeing certain content depending on the content. If the purported parent user denies authorization to the child user, the child user's account is denied.

Application of Verification Methods

The systems and methods described above can be applied to obtain parental consent for a child user in various online contexts. For example, the systems and methods of verification described above can be applied to obtain parental authorization of a child user's access to a third party system, which includes third party websites, online services, a game or other online application, a media item, a portion of a third party website, an online application that is run on a third party website, or media items shown on a third party website. In some embodiments, the social networking system can allow the parent to engage in ongoing monitoring of the child's use of the social networking system and/or other third party websites or services.

Figure 5:
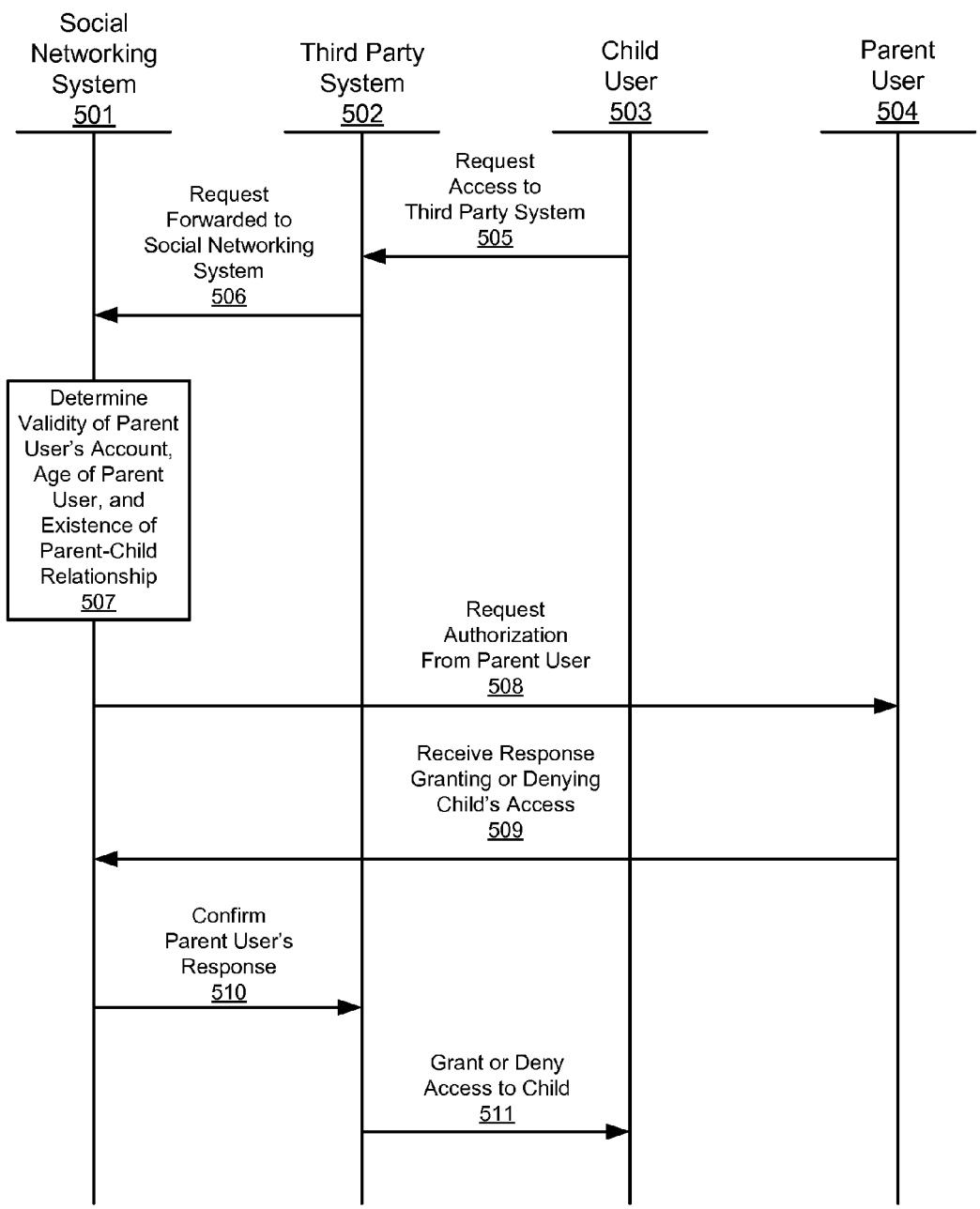
FIG. 5 is an interaction diagram of a parental authorization process for third party systems, in accordance with an embodiment of the invention.

FIG. 5 shows an interaction diagram of the verification process for a child user's 503 request to access a third party system 502. For instance, a child user 503 may request 505 access to a third party system 502, such as a movie rental website or online game application on a website. Upon requesting an account with the third party system 502, the child user 502 may receive a limited account or limited access to the third party system 502, until the child user 503 obtains parental consent to access the system 502. A request can be forwarded 506 from the third party system 502 to the API server 127 at the social networking system 501 to obtain parental authorization for the child user 503. The social networking system 501 determines 507 the validity of the parent user's account, the age of the parent user, and the existence of a parent-child relationship using the methods disclosed above. If the parent user's 504 account, age, and relationship with the child user are verified, the social networking system 501 requests 508 authorization from parent user 504 for the child user 503 to access the third party system 502. The social networking system 501 receives 509 a response from the parent user 504 granting or denying access for the child user 503 to the third party system 502. The social networking system 501 confirms 510 the parent user's 504 response to the third party system 502. The third party system 502 grants or denies 511 access to the child user 503 based on the response received from the parent user 504 via the social networking system 501. Accordingly, the verification methods described above allows the social networking system 501 to act as a clearinghouse to obtain parental consent for children to gain access to various third party systems.

In some embodiments, the request can be received directly from the child user 503 in the social networking system 501. In other embodiments, the request can be sent directly from a third party system 502 to the social networking system 501 based on a child user's 503 request to access the third party system 502. The third party system 502 can be the same system that the child user 503 requests access to, or the third party system 503 can make a request on behalf on another third party system 502. The third party system 502 can also request pre-approval of the child user's 503 account from the parent user 504. This allows the third party system 502 to automatically grant the child user's 503 request without forwarding 506 the request to the social networking system 501.

Regulation of a Child User's Account

Figure 6:
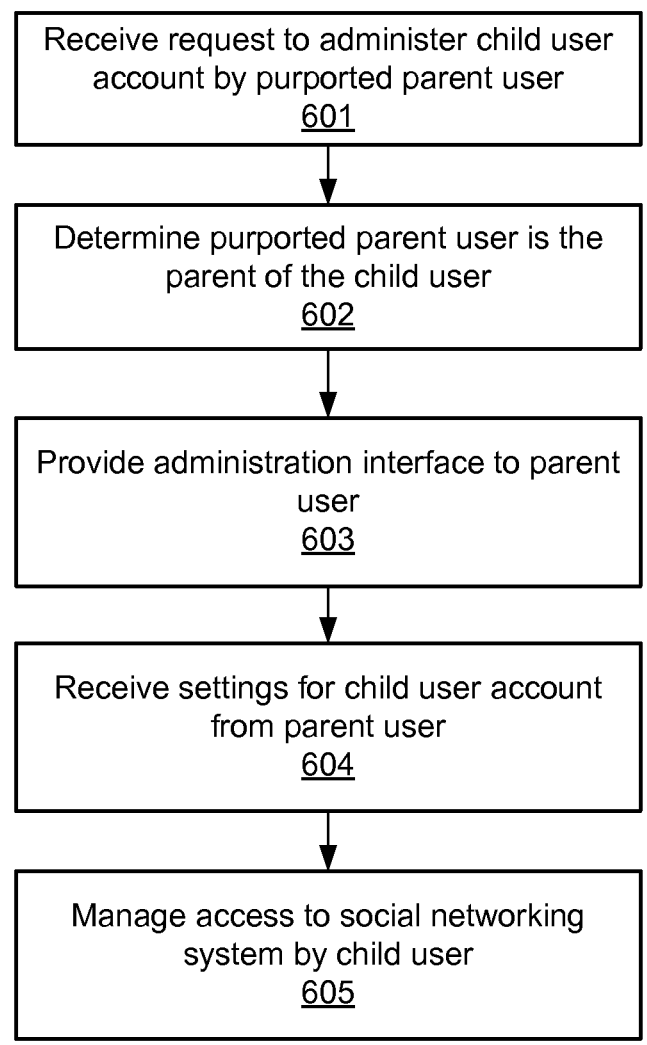
FIG. 6 is a flowchart of a process for administering a child user's account, in accordance with an embodiment of the invention.

FIG. 6 illustrates one embodiment of a method 600 for regulating a child user's account with an online service. In one embodiment, the regulation module 128 receives 601 a request from a purported parent user to administer a child user's account with an online service. Responsive to the request, the regulation module 128 determines 602 whether the purported parent user has a parental relationship with the child user. In one embodiment, the regulation module 128 accesses a user profile associated with the child user to determine whether the child user has a parental relationship with the purported parent user. A parental relationship between the child user and the purported parent user may have been determined as described above in conjunction with FIGS. 3 and 4. If the purported parent user has a parental relationship with the child user, the regulation module 128 provides 603 the purported parent user with an administration interface (e.g., a dashboard), which allows the parent user to provide and the regulation module 128 to receive 604 administrative settings for the child user's account. The settings may be used by the regulation module 128 to manage various interactions of the child user via the online service.

In one embodiment, the regulation module 128 allows the purported parent user to manage the credentials for the child's user account if a parental relationship exists. For example, the parent user is authorized to change or reset the child user's account password and/or to manage a password reset processes initiated with respect to the account. Illustratively, a parent user of a child user may specify that the online service, such as a social networking system, automatically notify the parent user when a password reset process has been initiated for the child user's account. Responsive to such a notification, the parent user may access the regulation module 128 to complete the password reset process or cancel the password reset process. For example, a parent user may cancel a password reset process when the child's user account has been accessed by an unauthorized source.

As another example, the regulation module 128 enables a parent user to manage connection requests (e.g., friend requests) associated with the child user's account. In one embodiment, the regulation module 128 notifies the parent user of requests received from other users to connect with the child user's account. The parent user may evaluate received connection requests and select connection requests to authorize, allowing the users associated with the selected connection requests to be connected to the child user's account. The regulation module 128 may additionally notify the parent user of connection requests sent by the child user to other users, and allow the parent user to determine whether the connection requests may be sent to their indicated recipients. Connection requests authorized by the parent user are sent from the child user to their identified recipients.

Further, the regulation module 128 may allow a parent user to regulate or specify the types of interactions that the child user may perform in an online system, such as a social networking system, or that other users may perform with respect to the child user. In one embodiment, the regulation module 128 enables the parent user to manage the users with which the child user is authorized to exchange communications via the online service. The regulation module 128 may also enable the parent user to identify objects (e.g., groups, events, pages, etc.) in the online service with which the child user is permitted to interact or with which the child user is not permitted to interact. For example, the parent user may specify that the child user is not permitted to join identified groups, attend identified events, or join identified pages of an online service, such as the social networking system. As another example, the parent user identifies that the child user is not permitted to provide "like" indications for specified objects of the online service.

The regulation module 128 may also enable the parent user to regulate other users to which the child user may subscribe. For example, the parent user may indicate whether the child user is permitted to subscribe to or "follow" other users of the social networking system that are not connected to the child user. Hence, a parent user may decide whether the child user is permitted to receive periodic updates regarding content generated by users not connected to the child user. Via the regulation module 128, a parent user may also control the child user's access to applications (e.g., third party games, third party software utilities, etc.) or a social application platform that may be leveraged by third parties available via the online service. In one embodiment, the regulation module 128 enables the parent user to identify on a granular level specific applications or characteristics of applications that the child user is permitted to or not permitted to access. Further, the regulation module 128 allows a parent user to disable or cancel the child user's account, which prevents the child user from accessing the online service using the account. In one embodiment, canceling the child user's account removes information associated with the account from the online service.

The regulation module 128 may moreover enable the parent user to manage the users permitted to tag the child user in images uploaded to the online service. As used herein, tagging refers to providing an indication of a user's identity in an image such as a digital photograph. An image in which a user is tagged may be associated with the user's profile or account. Hence, the regulation module 128 may allow the parent user to restrict those users that may tag the child user to the parent user, the child user, and/or friends of the child user.

After receiving administrative settings from the parent user, the regulation module 128 manages 605 the interactions of the child user over the online service based at least in part on the settings received from the parent user. For example, the regulation module 128 prevents the child user from exchanging chat messages based on settings received from the parent user. In one embodiment, the regulation module 128 additionally manages the child user based on policies of the online service specific to child users. For example, child user-specific policies may be automatically implemented by the regulation module 128 responsive to determining that a user associated with an account is a child. Policies of an online service specific to child users may be relatively more restrictive than the policies governing adult users of the social networking system. In some embodiments, the parent user of the child user may modify application of the online service's child user-specific policies for the child user.

In one embodiment, the regulation module 128 automatically restricts the child user from performing certain actions. For example, the child user may be prevented from unilaterally removing the parental relationship between the child user and the parent user. The child user may also be placed on a children, family, or relative list associated with the parent user. The regulation module 128 may also notify the parent user of interactions in the online service involving the child user. For example, the parent user automatically receives updates identifying the various actions performed by the child user, and/or actions performed by other users with respect to the child user. As examples of notifications, the regulation module 128 notifies the parent user when the child user has commented on a particular post of a friend or when the child user has been tagged in an image by another user. In one embodiment, the notifications provided to the parent user may be subject to certain limited privacy settings configured by the child user.

Content of the online service accessible to a child user may be regulated based on the child user's age. For example, objects (e.g., pages, groups, events, advertisements, applications, etc.) in the online service may each be associated with a particular age limit, preventing users younger than the age limit from accessing the object. The age limits may be automatically determined by the regulation module 128, input by an administrator of the online service, provided by a creator of the object, determined from the average age of online service users connected to the object, the average age of online service users that interacted with the object, social signals, and/or other suitable data. For example, an age limit of sixteen may be automatically imposed on a fan page of a social networking system based the average age of users connected to the fan page, based on the average age of users connected to users that are connected to the fan page or other suitable data. If the child user's age does not at least equal the age limit for an object, the child user is prevented from accessing the object. Referring to the previous example, if the child user is fourteen, the child user is not permitted to access the fan page.

In one embodiment, if the child user is below a minimum age threshold (e.g., under the age of 13 years old), the regulation module 128 further limits the interactions permitted by the child user. For example, the regulation module 128 may limit content accessible to a child user younger than the minimum age threshold to content generated by users connected to the child user (e.g., friends of the child user). As another example, the regulation module 128 prevents users younger than the minimum age threshold from accessing specific types of content. Illustratively, a child user younger than the minimum age threshold is permitted to access images uploaded to a social networking system, but not advertisements posted with the images.

The regulation module 128 may additionally prevent users of the online service that are above the minimum threshold age and not connected to a child user by two degrees or less (e.g., not a friend of a friend) from locating the child user via a search interface of the online service. In one embodiment, the regulation module 128 also prevents users that are not connected to a child user by two degrees or less and above the minimum threshold age from sending connection requests to the child user.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving, from a purported parent user, a request to regulate actions of a child user in a social networking system, the child user having an age that is less than a threshold age;
   accessing information associated with an account in the social networking system of the purported parent user and accessing information associated with an account in the social networking system of the child user;
   determining whether a parent-child relationship exists between the purported parent user and the child user based on (1) the information associated with the account of the purported parent user and (2) the information associated with the account of the child user, wherein determining whether a parent-child relationship exists between the purported parent user and the child user comprises:
      determining whether the account of the purported parent user is valid,
      determining whether the account of the purported parent user is associated with a purported parent user age that is equal to or exceeds an adult age threshold, and
      determining that the purported parent user has a parent-child relationship with the child user based on the determination that the account of the purported parent user is valid and on the determination that the account of the purported parent is associated with a purported parent user age that is equal to or exceeds the adult age threshold;
   responsive to determining an existence of a parent-child relationship between the purported parent user and the child user, determining whether the account of the purported parent user is connected to the account of the child user;
   responsive to determining that the account of the purported parent user is not connected to the account of the child user, automatically establishing, by a computer, a connection in the social networking system between the account of the child user and the account of the purported parent user, the established connection having a connection type indicating a parent-child relationship, wherein the child user is prevented from unilaterally terminating the established connection between the account of the child user and the account of the purported parent user;
   responsive to determining that the parent-child relationship exists between the purported parent user and the child user, prompting the purported parent user to provide administrative settings regulating actions of the child user in the social networking system;
   receiving, from the purported parent user, administrative settings regulating connection request actions of the child user in the social networking system; and
   managing actions by the child user in social networking system based on the administrative settings received from the purported parent user.

2. The computer-implemented method of claim 1, further comprising:
   automatically notifying the purported parent user about types of communications received by the child user in the social networking system, wherein the types of communications are specified by the administrative settings.

3. The computer-implemented method of claim 2, wherein the types of communications are selected from the group consisting of: an invitation to an event, a request to form a connection with an additional user of the social networking system, and a request to join a group in the social networking system.

4. The computer-implemented method of claim 1, further comprising:
   notifying the purported parent user of a request to connect to an additional user of the social networking system sent by the child user.

5. The computer-implemented method of claim 1, further comprising:
   transmitting, to the purported parent user, descriptions of updates to the account of the child user.

6. The computer-implemented method of claim 1, wherein the administrative settings indicates one or more types of social network connections that which the child user may establish.

7. The computer-implemented method of claim 1, wherein managing actions by the child user in the social networking system based at least in part on the administrative settings received from the purported parent user comprises:
   limiting actions in the social networking system capable of being performed by the child user to actions specified by the administrative settings.

8. The computer-implemented method of claim 1, wherein the administrative settings specify objects in the social networking system with which the child user is permitted to establish a connection.

9. The computer-implemented method of claim 8, wherein an administrative setting specifies whether the child user may receive information from other users in the social networking system with which the child user is not connected.

10. The computer-implemented method of claim 1, further comprising:
    limiting content accessible to the child user to content associated with users of the social networking system connected to the child user if the age of the child user is less than a minimum age based on information associated with the account of the child user.

11. The computer-implemented method of claim 1, further comprising:
hiding the account associated with the child user from appearing in search results from the social networking system if the age of the child user is less than a minimum age based on information associated with the account of the child user.

12. The computer-implemented method of claim 1, further comprising:
blocking receipt of connection requests from other users by the child user if the age of the child user is less than a minimum age based on information associated with the account of the child user.

13. The computer-implemented method of claim 1, further comprising:
receiving a request from the child user to access a social networking object that is associated with an age limit; and
denying the child user access to the social networking object responsive to determining that the age of the child user does not meet the age limit.

14. A system composing:
a processor; and
a non-transitory computer readable medium configured to store instructions, the instructions when executed by the processor cause the processor to:
receive, from a purported parent user, a request to regulate actions of a child user in a social networking system, the child user having an age that is less than a threshold age;
access information associated with an account in the social networking system of the purported parent user and accessing information associated with an account in the social networking system of the child user;
determine whether a parent-child relationship exists between the purported parent user and the child user based on (1) the information associated with the account of the purported parent user and (2) the information associated with the account of the child user, wherein the instructions for determining whether a parent-child relationship exists between the purported parent user and the child user cause the processor to:
determine whether the account of the purported parent user is valid,
determine whether the account of the purported parent user is associated with a purported parent user age that is equal to or exceeds an adult age threshold, and
determine that the purported parent user has a parent-child relationship with the child user based on the determination that the account of the purported parent user is valid and on the determination that the account of the purported parent is associated with a purported parent user age that is equal to or exceeds the adult age threshold;
responsive to determining an existence of a parent-child relationship between the purported parent user and the child user, determine whether the account of the purported parent user is connected to the account of the child user;
responsive to determining that the account of the purported parent user is not connected to the account of the child user, automatically establish a connection in the social networking system between the account of the child user and the account of the purported parent user, the established connection having a connection type indicating a parent-child relationship, wherein the child user is prevented from unilaterally terminating the established connection between the account of the child user and the account of the purported parent user;
responsive to determining that the parent-child relationship exists between the purported parent user and the child user, prompt the purported parent user to provide administrative settings regulating actions of the child user in the social networking system;
receive, from the purported parent user, administrative settings regulating connection request actions of the child user in the social networking system; and
manage actions by the child user in social networking system based on the administrative settings received from the purported parent user.

15. The system of claim 14, wherein the instructions further cause the processor to:
automatically notify the purported parent user about types of communications received by the child user in the social networking system, wherein the types of communications are specified by the administrative settings.

16. The system of claim 14 wherein the instructions further cause the processor to:
notify the purported parent user of a request to connect to an additional user of the social networking system sent by the child user.

17. The system of claim 14, wherein the instructions further cause the processor to:
transmit, to the purported parent user, descriptions of updates to the account of the child user.

18. The system of claim 14, wherein the administrative settings specify objects in the social networking system with which the child user is permitted to establish a connection.

* * * * *

UNITED STATES PATENT AND TRADEMARK OFFICE
CERTIFICATE OF CORRECTION

PATENT NO. : 8,966,590 B2  
APPLICATION NO. : 13/687867  
DATED : February 24, 2015  
INVENTOR(S) : Paul Janzer Page 1 of 1

It is certified that error appears in the above-identified patent and that said Letters Patent is hereby corrected as shown below:

In the claims

At Column 20, claim 6, line 43, after "settings" delete "indicates" and replace with "indicate"
At Column 20, claim 6, line 44, after "that" delete "which"

Signed and Sealed this
Twenty-third Day of February, 2016

Michelle K. Lee
*Director of the United States Patent and Trademark Office*